United States Patent [19]

Johnson

[11] 3,988,512

[45] Oct. 26, 1976

[54] CLOUDING CONTROL AGENT FOR BEVERAGES

[75] Inventor: Lawrence A. Johnson, Medina, Ohio

[73] Assignee: SCM Corporation, New York, N.Y.

[22] Filed: Apr. 17, 1975

[21] Appl. No.: 569,010

[52] U.S. Cl. .............................. 426/590; 426/654; 426/651; 252/356
[51] Int. Cl.$^2$ ........................................ B01F 17/30
[58] Field of Search .................... 426/330.3–330.5, 426/590–592, 576, 610–612, 654, 651; 252/356, 358, 351, 352

[56] References Cited

UNITED STATES PATENTS

| | | | |
|---|---|---|---|
| 2,968,563 | 1/1961 | Houser | 426/612 |
| 3,261,691 | 7/1966 | Erickson | 252/356 |
| 3,404,011 | 10/1968 | Eolkin | 426/654 |
| 3,490,918 | 1/1970 | Egaxi | 426/211 |
| 3,518,343 | 6/1970 | Welsh | 426/591 |
| 3,755,529 | 8/1973 | Procyk | 426/591 |

*Primary Examiner*—Hiram H. Bernstein
*Attorney, Agent, or Firm*—Thomas M. Schmitz

[57] ABSTRACT

A cloud control agent for use in aqueous beverages such as soft drinks comprising ethoxylated monoglyceride in combination with essential oils wherein the ratio of ethoxylated monoglyceride to essential oil is between about 0.01 to 2. The cloud for beverages and similar food products can be effectively controlled by varying the ratio from about 0.01 to 0.75 to obtain an opaque solution whereas a ratio of 0.75 to 0 provides a clear solution.

7 Claims, No Drawings

CLOUDING CONTROL AGENT FOR BEVERAGES

BACKGROUND OF THE INVENTION

This invention pertains to a cloud control agent for foods and particularly clouding agents for the beverages such as soft drinks and other aqueous beverages.

Cloud control agents are often utilized in beverages to control clouding which results from the use of oil-soluble flavors in combination with an essential oil which can be dispersed in aqueous systems. In the past, the beverage industry utilized brominated vegetable oil and ester gum to control the cloud characteristics in the finished beverage. Although these cloud control agents have provided adequate cloud control to beverages, these additives have become somewhat restricted for food use by government regulations.

It now has been found that certain combinations of ethoxylated monoglyceride essential oils can effectively disperse the essential oils into water media and produce a diverse range of opacity wherein the amount of transparency or opacity of the beverage can be controlled by adjusting the ratio of ethoxylated monoglyceride to essential oils wherein the ratio between 0.01 to 2 weight parts of ethoxylated monoglyceride are combined with 1 weight part of essential oil.

SUMMARY OF THE INVENTION

The cloud control agent comprises ethoxylated monoglyceride which is used in combination with essential oils in the weight ratio of between 0.01 to 2 weight parts ethoxylated monoglyceride to 1 part essential oil. Beverages containing relative concentrations of ethoxylated monoglyceride to essential oil above about 0.75 provide substantially transparent beverages, whereas below 0.75 the beverage is substantially cloudy or opaque. The beverage can contain food grade colors and flavor agents in addition to the cloud control agent. The invention further pertains to beverages containing water soluble flavors wherein vegetable oils are dispersed for clouding characteristics. Clouding characteristics can be controlled for such beverages or similar products such as gelatin desserts, alcoholic beverages and dry mix products for producing beverages. Clouding is controlled by the method of combining 0.01 to 0.75 parts ethoxylated monoglyceride per 1 part oil to produce an opaque solution and combining 0.75 to 2 parts ethoxylated monoglyceride to 1 part oil to produce a clear product.

DETAILED DESCRIPTION OF THE INVENTION

The cloud control agent of this invention is based on a combination of ethoxylated monoglyceride and essential oils dispersed in an aqueous medium of a beverage.

Ethoxylated monoglycerides conventionally described ethoxylated mono and diglycerides identified in 21 CFR 121.1221 which specifically sets forth the following specification: Saponification No. 65–75; acid number 0–2; hydroxyl number 65–80; and oxyethylene 60.5–65%. One of the primary methods of preparing ethoxylated monoglyceride is by reacting, at a temperature of about 180° C, ethylene oxide with a glyceride mixture containing from about 10 to 90% monoglyceride. Ethoxylated monoglycerides are shown in U.S. Pat. No. 3,490,918, which is specifically incorporated herein by reference. A further method of synthesizing ethoxylated monoglyceride comprises reacting ethylene oxide with glycerol in the presence of an alkaline catalyst to form a polyoxyethylene derivative of glycerol. Then the polyoxyethylene derivatives is sterilized with fatty acids. The fatty acid radical portion can be the same fatty acid radical employed in the formation of the partial ester of polyhydric alcohol and can be a fatty acid selected from stearic, palmitic, oleic acid, or mixtures thereof. The FDA Section 121.1221 (Chapter 1) cited above provides that the fatty acid portion comprises primarily a mixture of stearic, palmitic, and myristic acids. Generally, the ethoxylated monoglyceride will contain about 10–40 mole of ethylene oxide per mole of glycerol ester and preferably about 18 to 22 moles ethylene oxide per mole of glycerol ester. Ethoxylated monoglycerides generally define an ethoxylated ester or polyoxyethylene derivative of fatty acid ester of glycerol and predominantly a monoester. However, pure monoesters are seldom produced and the ethoxylated monoglyceride product can comprise mono-, di-, tri-, esters and partial esters of glycerides.

Essential oils are considered to be volatile materials isolated from an ordorous plant of a single botanical species by a physical process. Essential oils exist in plants and impart characteristic odors to flowers, leaves or woods such as terpenes, or are developed from plant constituents by enzyme action or by heat. Essential oils are soluble in alcohol or ether and can contain hydrocarbons, alcohols, phenols, ethers, aldehydes, ketones, acids, and esters. Synthetic essential oils are essential oils that contain components prepared by synthesis even though mixed with natural substances from natural essential oils. Suitable essential oils useful in this invention include for example sweet basil oil, bay oil, sweeth birch oil, oil of camphor, caraway oil, cardamon, cascarilla oil, cassia oil, cinnamon, coriander, ginger oil, grapefruit oil, lemon oil, lime oil, mandarin oil, bitter orange oil, sweet orange oil, and orris root oil. The preferred essential oils for use in this invention are sweet basil oil, caraway oil, cinnamon, lime oil, lemon oil, the orange oils, and mandarin oil. The oils may be natural or synthesized.

Most beverage systems utilize essential oils at the level of between about 0.05 to 3% by weight of the beverage and ordinarily contain essential oil flavoring agents of about 0.25% by weight. Ethoxylated monoglycerides are combined with essential oil in accordance with this invention in the ratio of between about 0.01 to 2 parts ethoxylated monoglyceride to 1 part of essential oil by weight. Preferably the ratio is between about 0.25 to 2. The ethoxylated monoglyceride has been found to effectively disperse the essential oils into water and that the degree of opacity or transparency can be controlled by adjusting the ratio of EOM to essential oil. At ratios from 0.01 to 0.75 the resulting stable dispersion is substantially opaque. At ratios exceeing 0.75 the dispersion is substantially transparent. In practice, beverages ordinarily contain sugar which can be dispersed in water followed by the addition of the ethoxylated monoglyceride and essential oils. The ingredients can be dispersed by an ordinary blender such as a Waring Blendor. For comparison test purposes, several samples were made and left to stand for at least 2 hours and thereafter evaluated for transparency on a Spectronic 100 spectrophotometer. The following examples illustrate this invention, but are not intended to be limiting.

EXAMPLE 1

The following components were compounded into an aqueous beverage: 1.0 gram of lemon oil; 8 grams of sugar; 1 gram of ethoxylated monoglyceride, and 90 grams of water.

The sugar was dissolved in warm water (100° F.) by a Waring Blendor at moderate speed for about 2 minutes. Then the ethoxylated monoglyceride (melted at 110° F.) was added to the aqueous solution and mixed. The lemon oil was then added and uniformly mixed into the solution for about 2 minutes. The aqueous mixture was allowed to set for at least 2 hours before testing for transparency on a spectrophotometer. Several different beverages having various ratios of ethoxylated monoglyceride to lemon oil were tested and the results are listed below in Table 1.

TABLE 1

| Emulsifier Ethoxylated Monoglyceride | Ratio Emulsifier To Lemon Oil | % Transmittance | | | | | |
|---|---|---|---|---|---|---|---|
| | | 400 | 500 | 600 | 700 | 800 | 900 |
| 0.25 % | 0.25 | 2.7 | 2.7 | 1.4 | 0.3 | 0.3 | 0.3 |
| 0.50 % | 0.50 | 1.9 | 2.1 | 1.0 | 0.4 | 1.0 | 1.7 |
| 0.60 % | 0.60 | 2.8 | 3.3 | 1.6 | 2.3 | 4.3 | 5.5 |
| 0.75 % | 0.75 | 4.2 | 7.8 | 3.0 | 3.0 | 5.2 | 5.8 |
| 1.00 % | 0.00 | 6.7 | 20.7 | 5.1 | 4.7 | 7.3 | 7.7 |
| 1.25 % | 1.25 | 6.1 | 20.5 | 4.6 | 4.7 | 7.4 | 7.9 |
| 1.50 % | 1.50 | 10.8 | 41.8 | 6.5 | 6.0 | 8.4 | 8.7 |
| 1.75 % | 1.75 | 8.0 | 30.5 | 5.1 | 5.5 | 8.2 | 8.3 |
| 2.00 % | 2.00 | 10.3 | 38.3 | 7.5 | 5.8 | 8.4 | 8.5 |

EXAMPLE 2

Several common emulsifiers were compared to ethoxylated monoglyceride by compounding beverages in the manner set forth in Example 1. The following Table 2 indicates comparative test results

TABLE 2

| Emulsifier | Ratio Emulsifier To Lemon Oil | % Transmittance | | | | | |
|---|---|---|---|---|---|---|---|
| | | 400 | 500 | 600 | 700 | 800 | 900 |
| Water | 0.0 | 41.9 | 100.0 | 9.4 | 8.2 | 10.7 | 10.2 |
| Triglycerol Monostearate | | | | | | | |
| 0.25 % | 0.25 | 2.4 | 2.3 | 1.7 | 0.3 | 0.3 | 0.3 |
| 0.50 % | 0.50 | 2.3 | 2.1 | 1.1 | 0.3 | 0.3 | 0.3 |
| 1.00 % | 1.00 | 2.3 | 2.3 | 1.1 | 0.3 | 0.8 | 0.3 |
| 1.50 % | 1.50 | UNSTABLE | | | | | |
| 2.00 % | 2.00 | UNSTABLE | | | | | |
| Diglycerol Monooleate | | | | | | | |
| 0.25 % | 0.25 | 1.8 | 1.7 | 1.0 | 0.3 | 0.3 | 0.3 |
| 0.50 % | 0.50 | 2.6 | 2.9 | 1.5 | 0.3 | 0.3 | 0.3 |
| 1.00 % | 1.00 | 2.7 | 2.6 | 1.5 | 0.3 | 0.3 | 0.3 |
| 1.50 % | 1.50 | UNSTABLE | | | | | |
| 2.00 % | 2.00 | UNSTABLE | | | | | |
| Polysorbate 60 | | | | | | | |
| 0.25 % | 0.25 | 2.8 | 3.7 | 1.2 | 0.3 | 0.3 | 0.3 |
| 0.50 % | 0.50 | 3.1 | 3.3 | 1.6 | 0.3 | 0.3 | 0.3 |
| 0.50 % | 0.50 | 3.1 | 3.3 | 1.9 | 0.3 | 0.3 | 0.3 |
| 0.75 % | 0.75 | 1.6 | 1.9 | 1.4 | 0.3 | 0.3 | 0.3 |
| 1.00 % | 1.00 | 2.8 | 2.2 | 1.8 | 0.3 | 0.3 | 0.3 |
| 1.25 % | 1.25 | 2.5 | 2.7 | 1.2 | 0.3 | 0.3 | 0.3 |
| 1.50 % | 1.50 | 2.8 | 3.0 | 1.7 | 0.4 | 0.4 | 0.4 |
| 1.75 % | 1.75 | 2.6 | 2.7 | 1.5 | 0.6 | 1.4 | 2.1 |
| 2.00 % | 2.00 | 4.9 | 5.2 | 2.7 | 1.7 | 3.3 | 4.2 |

EXAMPLE 3

A carbonated soft drink was formulated from a bottlers syrup and diluted with water. The bottlers syrup contained about 69.4 grams of 75° Brix liquid syrup; 28.3 grams water; 1.5 grams flavoring agent; 0.8 grams hydrous citric acid. The syrup was combined as indicated in Table 3 in formulations A, B, and C, and then combined with water to form the finished drink.

TABLE 3

| | SAMPLES | | |
|---|---|---|---|
| | A | B | C |
| Formulation | | | |
| Bottler's Syrup | 100.0 g. | 100.0 g. | 100.0 g. |
| 75° Brix Syrup | 69.4 g. | 69.4 g. | 69.4 g. |
| Water | 28.3 g. | 28.3 g. | 28.3 g. |
| Citric Acid | 0.8 g. | 0.8 g. | 0.8 g. |
| Lemon Oil 343 | 1.5 g. | 1.5 g. | 1.5 g. |
| Santelle EOM | 0.0 g. | 0.8 g. | 1.9 g. |
| Carbonated Water | 500.0 g. | 500.0 g. | 500.0 g. |
| Emulsifier Level | | | |
| % of Syrup as Emulsifier | 0.0 % | 0.8 % | 1.9 % |
| % of Finished Drink as Emulsifier | 0.0 % | 0.13 % | 0.32 % |
| Ratio of Emulsifier to Lemon Oil | 0.0 | 0.5 | 1.25 |
| Appearance | | | |
| Percent Transmittance: | | | |
| at 400 NM | 9.2 % | 3.5 % | 9.8 % |
| at 500 NM | 9.4 % | 3.5 % | 39.4 % |
| at 600 NM | 5.1 % | 1.8 % | 6.3 % |
| at 700 NM | 0.9 % | 1.2 % | 5.7 % |
| at 800 NM | 0.9 % | 2.4 % | 6.2 % |
| at 900 NM | 0.9 % | 3.1 % | 8.2 % |
| Remarks | Unstable, white, opaque | Stable, white, opaque | Stable, transparent |

This invention can also be used in beverages in which water soluble flavors are used. In which case vegetable oils are substituted for essential oils to generate the cloud characteristic. Vegetable oils include for example olive oils, peanut oil, corn oil, cotton seed oil, and soybean oil.

Other potential food applications include use as a clearing agent for gelatin desserts, alcoholic beverage dry mixes and "Kool Aid" products.

The foregoing examples illustrate the merits of this invention but are not intended to be limiting except by the appended claims.

I claim:

1. In an aqueous beverage containing by weight between about 0.05% to 3% essential oils wherein the improvement comprises:
   the inclusion of ethoxylated monoglyceride wherein the weight ratio of ethoxylated monoglyceride to said essential oil is between about 0.01 to 2.0.

2. The beverage in claim 1 wherein the said weight ratio of ethoxylated monoglyceride to essential oil is between about 0.01 up to about 0.75 and the beverage is substantially opaque.

3. The beverage in claim 1 wherein the weight ratio of said ethoxylated monoglyceride to said essential oil is at least about 0.75 and up to about 2.

4. The beverage set forth in claim 1 wherein the weight ratio of ethoxylated monoglyceride and essential oil is between about 0.25 and 2.

5. In a method of controlling the cloud characteristics of an aqueous beverage product containing between about 0.05% to 3% by weight of an oil selected from essential oil or vegetable oil, the improvement which comprises:
   dispersing in said beverage a cloud control agent of ethoxylated monoglyceride wherein the weight ratio of ethoxylated monoglyceride to said oil is between about 0.01 to 2.

6. The method set forth in claim 5 wherein the beverage is cloudy and the ratio of ethoxylated monoglyceride to oil is between 0.01 up to about 0.75.

7. The method set forth in claim 5 wherein the beverage is clear and the ratio of ethoxylated monoglyceride and oil is above about 0.75 up to about 2.

* * * * *